Patented Apr. 24, 1951

2,549,899

UNITED STATES PATENT OFFICE 2,549,899

PROCESS FOR THE PREPARATION OF NEPTUNIUM TETRAFLUORIDE

Sherman Fried, Chicago, Ill., and Norman R. Davidson, Sierra Madre, Calif., assignors to the United States of America as represented by the United States Atomic Energy Commission No Drawing. Application August 11, 1947, Serial No. 768,060

9 Claims. (Cl. 23—14.5)

This invention relates to a process for the preparation of neptunium tetrafluoride.

An object of the present invention is to provide for the preparation of neptunium tetrafluoride from neptunium dioxide.

Another object is the preparation of neptunium tetrafluoride from neptunium trifluoride.

Other objects will be apparent from the description which follows.

We have found that neptunium tetrafluoride can be prepared by contacting neptunium dioxide with hydrogen fluoride. The preferred temperature range is between 300° and 1000° C. and more especially between 400° and 700° C. Although hydrogen fluoride may be used alone, it is preferred that the contacting be carried out in the presence of an oxidizing agent, such as oxygen. In such a case, hydrogen fluoride and oxygen are preferably used in an equimolar proportion. Of course, instead of using neptunium dioxide, other neptunium compounds which decompose to neptunium dioxide at the reaction temperature can be used. Suitable neptunium compounds include neptunium hydroxide $(Np(OH)_4)$, neptunium carbonate $(Np(CO_3)_2)$, neptunium oxalate

$(Np(C_2O_4)_2)$ neptunium nitrate $(Np(NO_3)_4)$, and neptunyl nitrate $(NpO_2(NO_3)_2)$.

We have also found that neptunium tetrafluoride can be prepared by contacting neptunium dioxide with hydrogen fluoride in the presence of hydrogen to form neptunium trifluoride, and contacting the latter compound with hydrogen fluoride in the presence of an oxidizing agent, such as oxygen. Furthermore, neptunium trifluoride obtained by any method is converted to neptunium tetrafluoride by contacting with hydrogen fluoride and an oxidizing agent.

While the amount of hydrogen fluoride may be the stoichiometric amount, it is preferred that more than this quantity be used. The contact time varies inversely with the temperature. For a reaction temperature of 500° to 600° C., 15 minutes to 3 hours of contact time is suitable.

In one embodiment of this invention neptunium dioxide is contacted with hydrogen fluoride alone or in the presence of an oxidizing agent, such as oxygen. The preferred temperature and contact time are those mentioned above. The product is the desired neptunium tetrafluoride, which is useful for the preparation of the higher fluoride, namely, neptunium hexafluoride.

In another embodiment of the present invention neptunium dioxide is contacted with hydrogen fluoride in the presence of hydrogen to convert neptunium dioxide to neptunium trifluoride. The preferred temperature and contact time are between 300° and 1000° C. and 15 minutes to 3 hours. Excess hydrogen fluoride and hydrogen are removed from the product and the latter is contacted with hydrogen fluoride in the presence of an oxidizing agent, such as oxygen, preferably at a temperature between 300° and 1000° C. and for 15 minutes to 3 hours, to convert neptunium trifluoride to neptunium tetrafluoride.

In a third embodiment of this invention neptunium trifluoride is contacted with hydrogen fluoride in the presence of an oxidizing agent, such as oxygen, preferably at a temperature between 300° and 1000° C. This embodiment is the final step of the second embodiment. It is applicable to convert neptunium trifluoride obtained by the first step of the second embodiment or by any other method.

The following examples illustrate these embodiments of the invention.

Example I

Fifty micrograms of neptunium dioxide was placed in a platinum crucible and the latter was placed in a closed platinum vessel having a gas inlet and outlet. An equimolar mixture of hydrogen fluoride and hydrogen was passed into the vessel maintained at 500° C. for 1½ hours. The vessel was cooled, flushed with nitrogen and opened. The black product was identified by its X-ray diffraction pattern as neptunium trifluoride $(NpF_3)$. Twenty-five micrograms of neptunium trifluoride was put in the crucible and the latter returned to the reaction vessel. While maintaining the vessel and contents at 500° C., an equimolar mixture of hydrogen fluoride and oxygen was introduced for 1½ hours. The system was cooled and the product removed. It was a light green solid and was identified by its X-ray diffraction pattern as neptunium tetrafluoride $(NpF_4)$. It was monoclinic and isomorphous with green uranium tetrafluoride $(UF_4)$. The unit cell contained 12 molecules. The lattice dimensions were:

$a_1 = 12.67 \pm 0.06$ Å.
$a_2 = 10.62 \pm 0.05$ Å.
$a_3 = 8.31 \pm 0.05$ Å.
$\alpha_2 = 126°\ 10'$ The calculated density was $\rho = 6.84$.

Example II

In the apparatus described in Example I, 50 micrograms of neptunium dioxide was maintained at 500° C. and an equimolar mixture of hydrogen fluoride and oxygen was introduced for 1 hour. The light green product was identified as neptunium tetrafluoride.

*Example III*

Using the apparatus of Example I, 100 micrograms of neptunium dioxide was maintained at 600° C. and hydrogen fluoride was introduced for 30 minutes. The product was identified by its X-ray diffraction pattern at neptunium tetrafluoride.

Although the examples have described experiments that were carried out on a small scale, it is to be understood that the process of the present invention is suitably carried out on a large scale and that the necessary equipment would be apparent to those skilled in the art.

While preferred embodiments of the present invention are described above, other modifications may be made without departing from the spirit and scope of the invention. Thus, this invention is not to be limited to the examples but it is to be limited only by the appended claims.

What is claimed is:

1. A process for the preparation of neptunium tetrafluoride which comprises contacting neptunium dioxide with hydrogen fluoride in the presence of an oxidizing agent at a temperature between 300° and 1000° C.

2. The process of claim 1 wherein the oxidizing agent is oxygen.

3. A process for the preparation of neptunium tetrafluoride which comprises contacting neptunium dioxide with hydrogen fluoride in the presence of oxygen at a temperature between 400° and 700° C.

4. A process for the preparation of neptunium tetrafluoride which comprises contacting neptunium dioxide with hydrogen fluoride in the presence of hydrogen, removing the mixture of hydrogen and hydrogen fluoride, and contacting the resultant neptunium trifluoride with hydrogen fluoride in the presence of an oxidizing agent.

5. A process for the preparation of neptunium tetrafluoride which comprises contacting neptunium dioxide with hydrogen fluoride in the presence of hydrogen at a temperature between 300° and 1000° C., removing the mixture of hydrogen and hydrogen fluoride, and contacting the resultant neptunium trifluoride with hydrogen fluoride in the presence of an oxidizing agent at a temperature between 300° and 1000° C.

6. The process of claim 5 wherein the oxidizing agent is oxygen.

7. A process for the preparation of neptunium tetrafluoride which comprises contacting neptunium trifluoride with hydrogen fluoride in the presence of an oxidizing agent at a temperature between 300° and 1000° C.

8. The process of claim 7 wherein the oxidizing agent is oxygen.

9. A process for the preparation of neptunium tetrafluoride which comprises contacting neptunium trifluoride with hydrogen fluoride in the presence of oxygen at a temperature between 400° and 700° C.

SHERMAN FRIED.
NORMAN R. DAVIDSON.

REFERENCES CITED

The following references are of record in the file of this patent:

Fownes' Elementary Chemistry, edited by Bridges from 10th British edition, page 276 (1876). Published by Henry C. Lea, Philadelphia, Pennsylvania. (Copy in Sci. Lib.)

Friend, Textbook of Inorganic Chemistry, vol. VII, part III, page 291 (1926). Published by Charles Griffin & Co., Ltd., London. (Copy in Sci. Lib.)

Seaborg, Chemical and Engineering News, vol. 23, No. 23, pages 2190–2193 (1945). (Copy in Sci. Lib.)